March 12, 1929.　　　R. N. DOLSEN　　　1,705,397
DEMOUNTABLE RIM FOR PNEUMATIC TIRES
Filed June 1, 1927
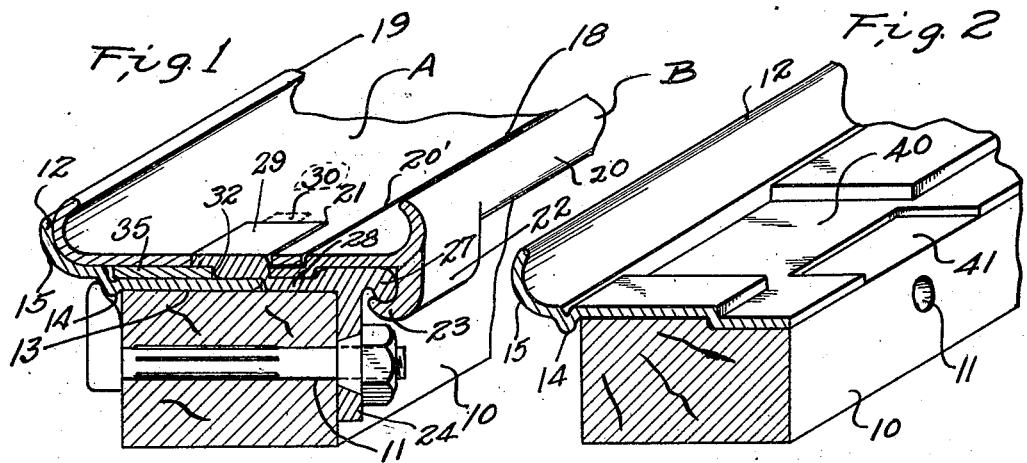
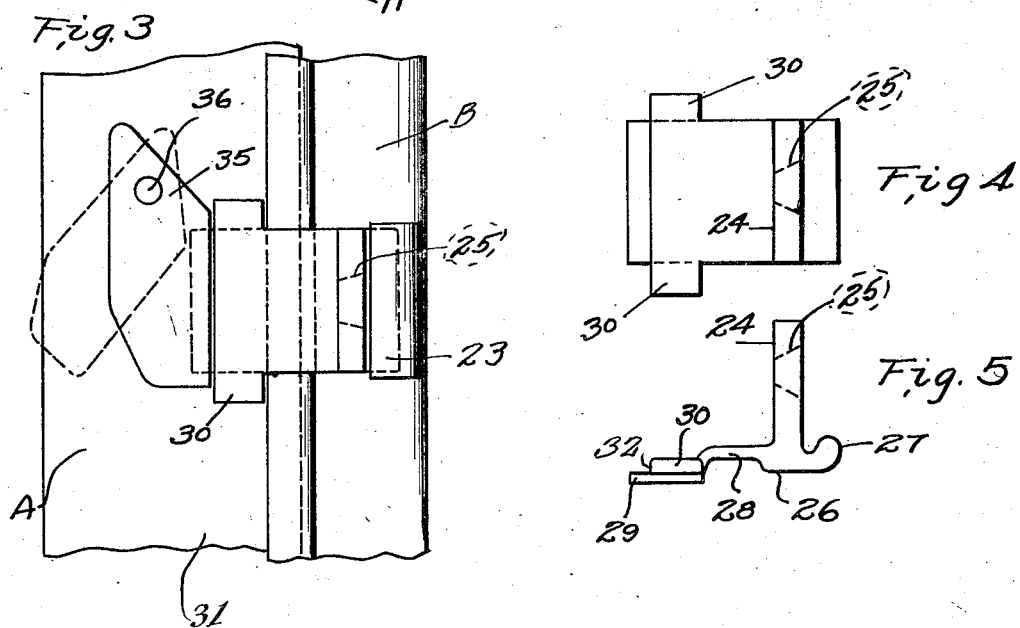
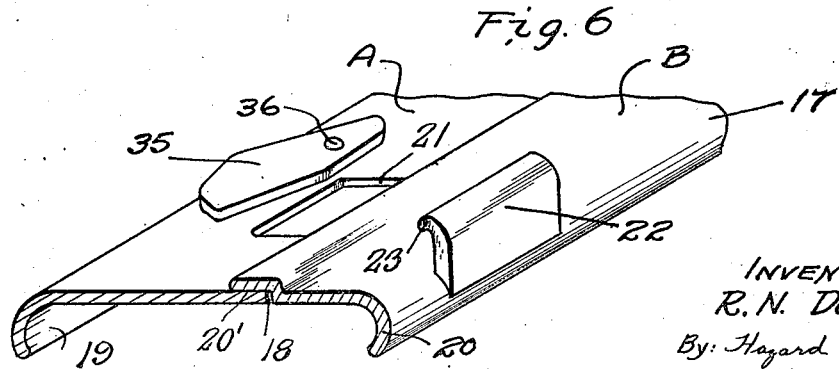
INVENTOR
R. N. Dolsen
By: Hazard and Miller
Attorneys Patented Mar. 12, 1929.

1,705,397

UNITED STATES PATENT OFFICE.

RAYMOND N. DOLSEN, OF LOS ANGELES, CALIFORNIA.

DEMOUNTABLE RIM FOR PNEUMATIC TIRES.

Application filed June 1, 1927. Serial No. 195,706.

This invention relates to automobile accessories, and more particularly to a demountable split rim for straight side or clincher tires, and it is an object of this invention to provide a rim which may be mounted on the felly of a wheel, and which will permit rapid and easy changing of tires.

Practically every motorist is familiar with the difficulties that are encountered when on the road and it becomes necessary to change tires. The conventional type of rim now on the market necessitates the hammering and prying of the tire to release the same from the rim. Very often the tire is irreparably damaged by such handling, and my invention is therefore, a remedy for this existing condition. By providing a split rim, it is comparatively easy to separate the sections and remove the tire from the rim with little or no prying.

Another object of this invention is to provide a rim which will eliminate wabbly wheels caused by rims that have become sprung by virtue of the fact that tires have been pried over the same, and another object of the invention is to provide a device which eliminates the use of tire irons completely, and will not endanger the hands of an amateur mechanic attempting to change the tire.

A still further object of the invention is to provide a device which may be marketed for a nominal sum, and which will be economical by virtue of the fact that if it is necessary to ever run the machine without a tire, it will be unnecessary to replace the entire rim, either piece being replaceable as the case may be.

Yet another object of this invention is to provide a device which is simple in its construction, efficient in its operation, is unlikely to get out of order, and is well adapted to perform the services required of it.

With these and many other objects in view which will more readily appear as the nature of the invention is better understood, the same consists in the novel construction, combination and arrangement of parts, which will hereinafter be more fully described, illustrated, and claimed.

The essential features of the invention involved in the carrying out of the objects indicated are susceptible to modification; but a preferred embodiment of the invention is shown in the accompanying drawings, in which:

Figure 1 is a perspective view in section showing my assembled automobile rim in position on the wheel felly of an automobile.

Fig. 2 is a similar sectional perspective view showing the device with certain parts removed to more clearly reveal the nature of my invention.

Fig. 3 is an inner plan view of a section of the device.

Figs. 4 and 5 respectively, are plan and side views of the retaining lug I employ in connection with my invention, and Fig. 6 is a perspective view of a section of my rim detached from the wheel, the portion which is illustrated being inverted from its normal position.

The device involves in its general organization a felly designated at 10, a section of which is shown in Figure 1. This felly is provided with a plurality of apertures therethrough, at equal distances around the margin thereof for the reception of bolts 11. An annular retaining unit 12 is attached to the felly 10 by a plurality of rivets or the like not shown in the drawings. This retaining unit is formed of sheet iron and in cross section has a flat portion 13, an inwardly extending shoulder 14 and a curved retaining portion 15. The split rim assembly designated in Figure 6 at 17 is received upon this retaining member. This assembly comprises in combination a rim which is split annularly as at 18 to provide a comparatively wide section A and a narrow section B. These sections are provided with retaining flanges 19 and 20 respectively. These flanges may be constructed in any suitable manner for use on straight side or clincher tires as the case may be. A lap joint 20' is formed where the two sections engage each other, and a number of preferably rectangular cut-out portions 21 are formed at suitable points around the periphery of the section A for a purpose to be described later.

The section B is provided at suitable points on the outer retaining flange with a plurality of inwardly extending lugs 22. These lugs have laterally extending portions 23 thereon, and the purpose thereof will appear later. These lugs may be formed integral with the rim or attached thereto in any suitable manner as by riveting, welding or the like.

In Figures 4 and 5 are illustrated the retaining lugs employed in connection with this invention. These lugs may be formed of small castings and have flat portions 24 which are adapted to fit tightly against one face of the felly as shown in Figure 1. An aperture 25 extends through this flat portion and is adapted to receive the shank of one of the bolts 11. A lateral portion is shown at 26, which portion provides a fillet like portion 27 receivable in the curved portion 23. A reduced portion is shown at 28 and on the outer end of the reduced portion there is provided an offset flat portion 29 which is complementary in shape to and is adapted to be seated within, one of the cut-out portions 21 before referred to. A wing 30 extends outwardly on each side of the flat portion 29 at an offset, and rests on the inner surface 31 of the section A. A retaining lug 35 is pivoted as at 36 to the inner face of the piece A, and this retaining lug may be swung against the shoulder 32 between the flat portion 29 and the wings 30 of the retaining lugs, thus locking the lugs against displacement to securely hold the piece A in position. The reduced portion 28 receives the offset of the piece B as clearly shown in Figure 1, and cut-out portions 40 in the flat portion 13 of the retaining unit 12 are provided to accomodate the operative parts of the various retaining elements. A cut-away portion 41 is provided to receive the reduced portion 28.

In actual operation the device is assembled on the felly as shown clearly in Figure 1, the fillet portion 27 engaging the curved portion 23 of the lugs 22 to retain the parts in position. When desired to remove the tire from the wheel, the bolts 11 are released from their engagement from the parts 24, and the piece A which is firmly secured to the piece B may be removed from the wheel when the tire has an assembled entirety. The pivoted retaining lugs 35 are then swung outwardly as shown in dotted lines in Figure 3 to release the part 29, and by pressing the said part through the cut-out portion 21, the fillet portion 27 releases its engagement with the curved part 23, and the pieces A and B may easily be separated. The piece B is preferably pulled from beneath the bead on the tire, and it is then a comparatively easy matter to pull the tire from the piece A. When the tire has been repaired or changed, the parts may be assembled by a reversal of this process.

I do not desire to limit myself to the exact arrangement and construction of parts shown in the accompanying drawings, for I contemplate making various minor changes in the details of construction to conform with the spirit of the invention.

It is obvious then that I have provided an automobile rim which is efficient in its operation, which may be manufactured inexpensively, and is well adapted to perform the services required of it.

What I claim and desire to secure by Letters Patent, is:

1. A rim for automobile wheels comprising in combination a pair of rim sections, each rim section having an annular retaining flange, inwardly extending lugs on one of said retaining flanges, said lugs having laterally extending hook portions, members having fillet portions receivable in said hook portions, and offset portions, there being apertures in said other rim section, said offset portions being received in said apertures to hold the rim sections together.

2. A device of the character described comprising a pair of rim sections, each of said sections being annular in form and having a retaining flange thereon, inwardly extending lugs having laterally extending portions thereon, retaining pieces having fillet portions receivable in said laterally extending portions, reduced portions and offset portions, there being apertures in said other rim section, said offset portions being received in said apertures, said sections presenting a continuous lap joint at their lines of contact, said lap joint being receivable in said reduced portions.

3. A demountable rim comprising a pair of rim sections with their adjacent edges disposed in a lap joint inwardly extending lugs on one of said rim sections, having laterally extending portions providing hooks, retaining pieces having fillets which are received in said hooks, reduced portions on said retaining pieces and offset portions, said lap joint being received in said reduced portions, there being apertures in said other rim section, said offset portions being received in said apertures, and inwardly extending flanges on said retaining pieces having apertures therethrough.

4. A device as claimed in claim 3, and in addition, wings on said offset portions adapted to bear against said last mentioned rim section.

5. A demountable rim comprising a pair of rim sections disposed with their adjacent edges in overlapping arrangement, inwardly extending lugs on one of said rim sections, having laterally extending portions providing hooks, retaining pieces having fillets which are received in said hooks, reduced portions on said retaining pieces and offset portions, the lap joint between said rim sections being received in said reduced portions, there being apertures in said other rim section, said offset portions being received in said apertures, inwardly extending flanges on said retaining pieces having apertures therethrough, wings on said offset portions adapted to bear against said last mentioned rim section, and lugs pivoted to said last mentioned section on the inner face thereof, adapted to bear against said offset portions and hold the same within said apertures.

In testimony whereof I have signed my name to this specification.

RAYMOND N. DOLSEN.